J. TUCHOLSKI & A. E. KOZICZENSKI.
WOODWORKING TOOL.
APPLICATION FILED APR. 30, 1910.
992,392.
Patented May 16, 1911.
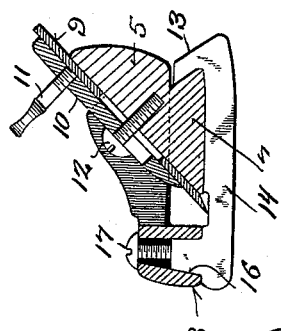
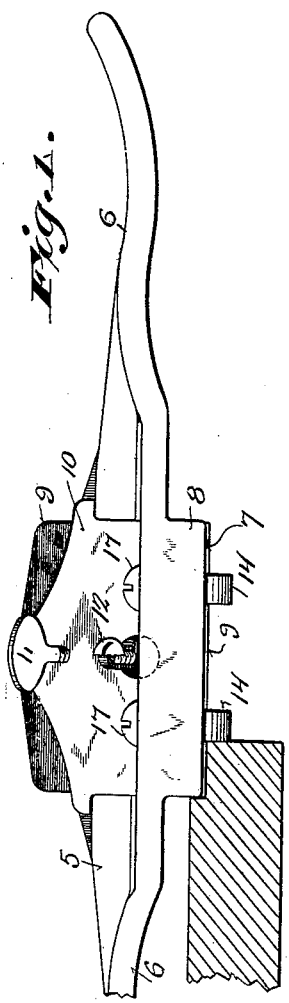
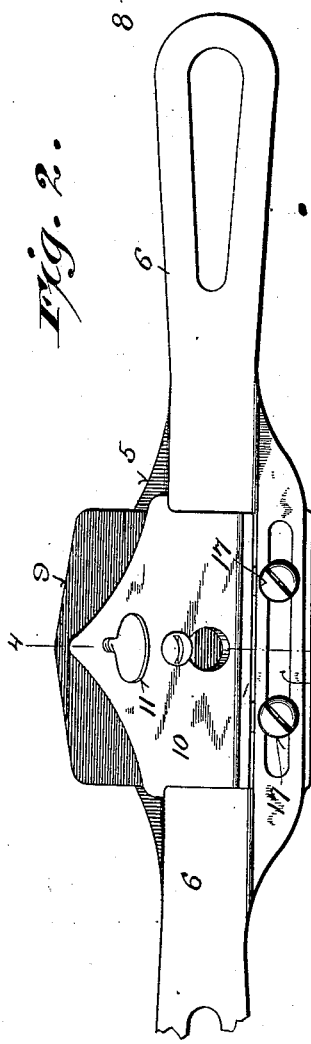
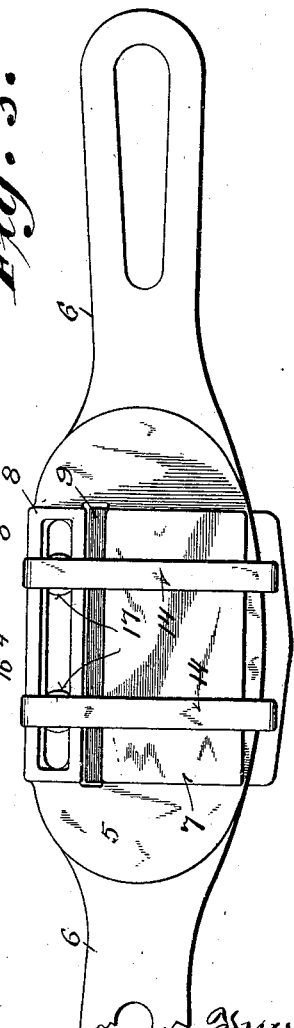
Witnesses:
Casimir Young
May Downey
Inventors
John Tucholski
Antoni Edmond Koziczenski
By Oliphant Young
Attorneys

UNITED STATES PATENT OFFICE.

JOHN TUCHOLSKI AND ANTONI EDMOND KOZICZENSKI, OF RACINE, WISCONSIN.

WOODWORKING-TOOL.

992,392.  Specification of Letters Patent.  Patented May 16, 1911.

Application filed April 30, 1910. Serial No. 558,576.

*To all whom it may concern:*

Be it known that we, JOHN TUCHOLSKI and ANTONI EDMOND KOZICZENSKI, both citizens of the United States, and residents of Racine, in the county of Racine and State of Wisconsin, have invented certain new and useful Improvements in Woodworking-Tools; and we do hereby declare that the following is a full, clear, and exact description thereof.

Our invention consists in what is herein particularly set forth with reference to the accompanying drawings and pointed out in the claim of this specification, its object being to provide simple, economical and efficient tools of the spoke-shave species designed to facilitate smoothing, rabbeting and molding work without injury to operators, as well as to provide for accurate gaging of width of cut in rabbeting and molding operations, whether said tools be drawn or pushed by their operators as the grain of the wood worked upon may require.

Figure 1 of the drawings represents a front elevation of a wood-working tool in accordance with our invention having a wedge clamping screw thereof partly broken away, and in this view the cutting of a rabbet is illustrated; Fig. 2, a plan view of the tool; Fig. 3, a similar view of the same reversed, and Fig. 4, a transverse section of said tool indicated by 4—4 in Fig. 2.

Referring by numerals to the drawings, 5 indicates the central stock, and 6 each of the oppositely extending handles of our improved tool said stock and handles being preferably cast together in one piece. The sole 7 is a central depending extension of the stock, whereby more than ordinary clearance is had under the handles, in order to prevent injury to the hands of an operator and to avoid marring of the work adjacent to a cut of said tool, especially when the same is used upon curved work.

A longitudinal slot is provided in the forward portion of the stock through a depending flange 8 of the same, the under extremity of this flange being approximately flush with the sole, and said stock is provided with an angular bit and wedge opening such as is common in planes of various species. The bit 9, wedge 10 and clamp screws 11, 12 for the same herein shown, are also common in the art.

Matching the preferably beveled rear edge of the sole 7, we show hook-ends 13 of gage-bars 14, and each of these bars is provided with a socket-stud 15 that engages the slot 16 of the forward flanged portion of the tool-stock. The contour of each gage-bar stud and the tool-stock slot is such that there is wedging fit of one within the other, and a clamp-screw 17 is employed in engagement with said stud to draw and hold the same in said slot, the gage-bar being adjustable longitudinally of the sole (across which it extends) in proportion to the width of cut desired on the part of the bit in rabbeting or molding operations. By the employment of a pair of gage-bars, as is herein shown, adjusted equi-distant from the sides of the opposing sole, the tool may be drawn or pushed by an operator when cutting rabbets or moldings according as the grain of the wood worked upon is found to run one way or the other, said tool being turned about from time to time to change the cutting direction of its bit.

A straight edge bit being employed, as herein shown, the width of a rabbet may be accurately determined by an adjustment of one or both of the gage-bars 14, and the cutting of the rabbet can be more rapidly and accurately effected than is possible by chiseling. For smooth-work or wide molding, the gage-bars are omitted from the tool and said tool manipulated similar to those of the ordinary spoke-shave species, but to greater advantage because of the clearance afforded for the hands of the operator as above specified.

We claim:

In a woodworking tool of the spoke-shave species, the combination with its central stock having a forward depending and longitudinally slotted flange the under extremity of which is approximately flush with the sole of said stock, a gage-bar that crosses the aforesaid sole and has matching hook engagement with the same at the rear thereof, a socket-stud that extends from the gage-bar and has wedging fit with the slot
5 of the stock-flange, and a clamp-screw engaging the stud.

In testimony that we claim the foregoing we have hereunto set our hands at Racine in the county of Racine and State of Wisconsin in the presence of two witnesses.

JOHN TUCHOLSKI.
ANTONI EDMOND KOZICZENSKI.

Witnesses:
CHRISTIAN JOHNSON,
MICHAEL OKOLEURKI.

Copies of this patent may be obtained for five cents each, by addressing the "Commissioner of Patents, Washington, D. C."